(12) United States Patent
Iijima

(10) Patent No.: US 7,747,152 B2
(45) Date of Patent: Jun. 29, 2010

(54) LENS BARREL AND DIGITAL CAMERA

(75) Inventor: Shuji Iijima, Yokohama (JP)

(73) Assignee: Nikon Corporation, Tokyo (JP)

( * ) Notice: Subject to any disclaimer, the term of this patent is extended or adjusted under 35 U.S.C. 154(b) by 209 days.

(21) Appl. No.: 12/007,594

(22) Filed: Jan. 11, 2008

(65) Prior Publication Data

US 2008/0175573 A1 Jul. 24, 2008

(30) Foreign Application Priority Data

Jan. 23, 2007 (JP) ............................. 2007-012478

(51) Int. Cl.
*G03B 17/00* (2006.01)
*H04N 5/228* (2006.01)
*G02B 27/64* (2006.01)

(52) U.S. Cl. ..................... 396/55; 348/208.11; 359/557

(58) Field of Classification Search ................... 396/55, 396/52; 348/208.99, 208.2, 208.4, 208.7, 348/208.11; 359/554, 557
See application file for complete search history.

(56) References Cited

U.S. PATENT DOCUMENTS

| 5,416,558 | A | 5/1995 | Katayama et al. |
| 6,272,288 | B1 | 8/2001 | Takeuchi et al. |
| 6,701,071 | B2 * | 3/2004 | Wada et al. ................... 396/55 |
| 2001/0014213 | A1 * | 8/2001 | Terada .......................... 396/55 |
| 2007/0133092 | A1 * | 6/2007 | Maeda et al. ............... 359/557 |

FOREIGN PATENT DOCUMENTS

| EP | 1 607 792 | 12/2005 |
| JP | 2004-258689 | 9/2004 |

OTHER PUBLICATIONS

Extended European Search Report, mailed May 8, 2008 and issued in corresponding European Patent Application No. 08100733.8-2217.

* cited by examiner

*Primary Examiner*—Rochelle-Ann J Blackman
(74) *Attorney, Agent, or Firm*—Staas & Halsey LLP

(57) ABSTRACT

A lens barrel includes: a vibration reduction mechanism comprising a vibration reduction lens and a drive device that drives the vibration reduction lens, so as to compensate for image vibration; and a shutter unit for exposure control. The drive device and the shutter unit are arranged so as at least partially to overlap in a direction orthogonal to an optical axis of the lens barrel.

10 Claims, 5 Drawing Sheets

FRONT ←————→ BACK

LENS BARREL AND DIGITAL CAMERA

INCORPORATION BY REFERENCE

The disclosure of the following priority application is herein incorporated by reference:

Japanese Patent Application No. 2007-012478 filed Jan. 23, 2007.

BACKGROUND OF THE INVENTION

1. Field of the Invention

The present invention relates to a lens barrel, and to a digital camera.

2. Description of Related Art

A lens barrel that is capable of optical vibration reduction is per se known. Optical vibration reduction alleviates shaking of the image upon the light receiving surface by driving a vibration reduction lens that is included in the photographic lens in a direction orthogonal to the optical axis. A lens barrel that includes an optical vibration reduction device and a shutter unit is disclosed in Japanese Laid-Open Patent Publication No. 2004-258689.

Such a vibration reduction device includes the vibration reduction lens and a drive mechanism for driving the vibration reduction lens. The shutter unit includes a shutter main body having shutter blades, and a drive mechanism for driving the blades. Accordingly when, as described in the above cited publication, the vibration reduction device and the shutter unit are arranged simply in sequence along the direction of the optical axis, the total length of the lens barrel when it is in the retracted state becomes comparatively long.

SUMMARY OF THE INVENTION

A lens barrel according to a first aspect of the present invention includes: a vibration reduction mechanism comprising a vibration reduction lens and a drive device that drives the vibration reduction lens, so as to compensate for image vibration; and a shutter unit for exposure control, wherein: the drive device and the shutter unit are arranged so as at least partially to overlap in a direction orthogonal to an optical axis of the lens barrel.

According to a second aspect of the present invention, in the lens barrel according to the first aspect, it is preferable that the shutter unit includes a shutter main body and a shutter drive unit; and that a rear surface of a support member that supports the drive device is positioned in substantially a same plane as a rear surface of the shutter main body.

According to a third aspect of the present invention, in the lens barrel according to the first aspect, the shutter unit may be shaped as a circle with a portion cut away as seen from a direction of the optical axis; and the drive device may be arranged so as to be embedded in the cut away portion of the shutter unit.

According to a fourth aspect of the present invention, in the lens barrel according to the first aspect, it is preferable that the drive device includes a pair of voice coil motors, with each of the voice coil motors comprising a drive magnet and a coil; and that positions of the coils in a direction of the optical axis substantially correspond to a position of the shutter unit in a direction of the optical axis.

According to a fifth aspect of the present invention, in the lens barrel according to the fourth aspect, the coils may be disposed below the shutter unit with respect to the direction orthogonal to the optical axis so as to form a V-shape by arranging the coils to be perpendicular to one another.

A digital camera according to a sixth aspect of the present invention includes a lens barrel and an imaging unit that comprises an image sensor, and the lens barrel includes: a vibration reduction mechanism comprising a vibration reduction lens and a drive device that drives the vibration reduction lens, so as to compensate for image vibration; and a shutter unit for exposure control, wherein the drive device and the shutter unit are arranged so as at least partially to overlap in a direction orthogonal to an optical axis of the lens barrel.

According to a seventh aspect of the present invention, in the digital camera according to the sixth aspect, it is preferable that the shutter unit includes a shutter main body and a shutter drive unit that is fixed to a rear surface of the shutter main body; and that the shutter drive unit and the imaging unit are arranged so as at least partially to overlap in a direction orthogonal to the optical axis of the lens barrel.

According to a eighth aspect of the present invention, in the digital camera according to the sixth aspect, the imaging unit may further include an optical filter that is disposed in front of the image sensor.

According to a ninth aspect of the present invention, in the lens barrel according to the second aspect, the shutter unit may be shaped as a circle with a portion cut away as seen from a direction of the optical axis; and the drive device may be arranged so as to be embedded in the cut away portion of the shutter unit.

According to a tenth aspect of the present invention, in the lens barrel according to the second aspect, it is preferable that the drive device comprises a pair of voice coil motors, with each of the voice coil motors comprising a drive magnet and a coil; and that positions of the coils in a direction of the optical axis substantially correspond to a position of the shutter unit in a direction of the optical axis.

According to a eleventh aspect of the present invention, in the lens barrel according to the third aspect, it is preferable that the drive device comprises a pair of voice coil motors, with each of the voice coil motors comprising a drive magnet and a coil; and that positions of the coils in a direction of the optical axis substantially correspond to a position of the shutter unit in a direction of the optical axis.

According to a twelfth aspect of the present invention, in the digital camera according to the seventh aspect, the imaging unit may further include an optical filter that is disposed in front of the image sensor.

DESCRIPTION OF THE PREFERRED EMBODIMENT

An embodiment of the present invention will now be explained using FIGS. 1 through 5. The external appearance of a digital camera 200 equipped with a lens barrel, according to this embodiment of the present invention, is shown in FIG. 5.

Figure 1:
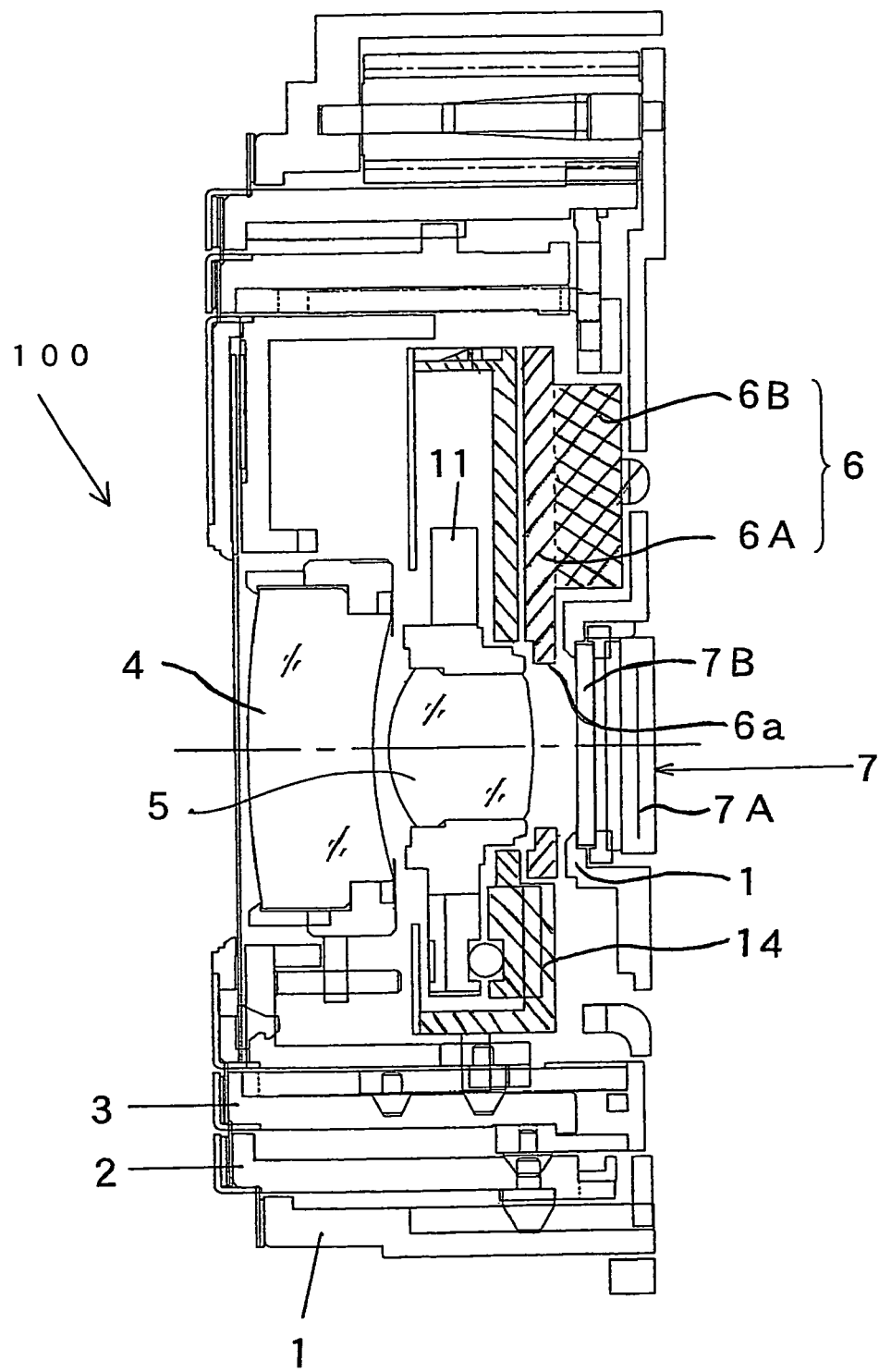
FIG. 1 is a sectional view showing a lens barrel unit and an imaging unit of a digital camera, according to an embodiment of the present invention.
Figure 2:
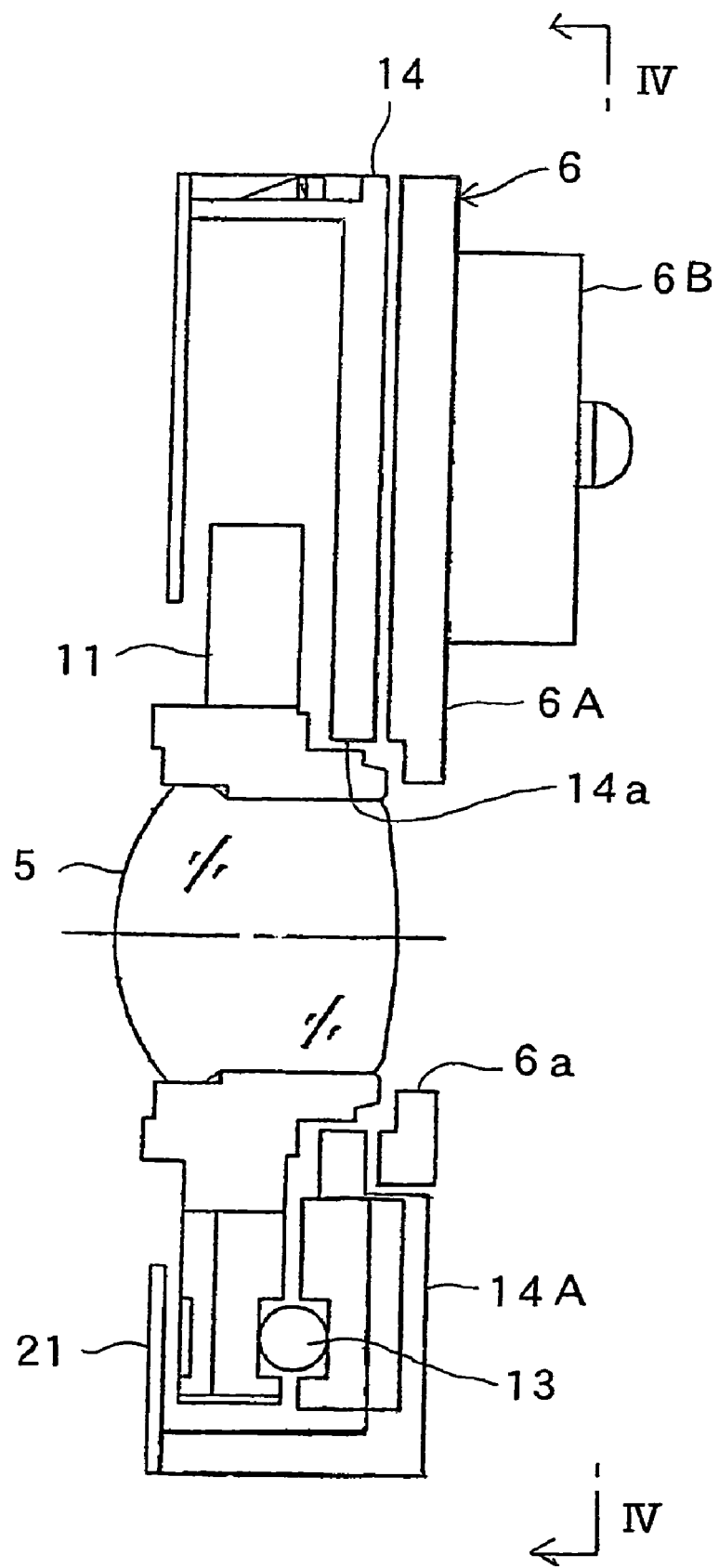
FIG. 2 is a partial enlarged view of FIG. 1, showing a vibration reduction mechanism and a shutter unit.

FIG. 1 is a sectional view showing a lens barrel unit 100 and an imaging unit 7 of the digital camera 200 according to this embodiment, and FIG. 2 is a partial enlarged view showing the lens barrel unit 100 and the imaging unit 7. The lens barrel unit 100 includes a plurality of lenses, and zooming can be performed by driving these lenses forwards and backwards along the direction of the optical axis. In FIG. 1, the lens barrel unit 100 is shown in the retracted state.

As shown in FIG. 1, the lens barrel 100 includes a fixed barrel 1, a first drive barrel 2 that can be driven forwards and backwards along the direction of the optical axis with respect to the fixed barrel 1, and a second drive barrel 3 that can be driven forwards and backwards along the direction of the optical axis with respect to the first drive barrel 2. A focusing lens 4, that constitutes a first lens group, is disposed inside the second drive barrel 3, and a vibration reduction lens 5, that constitutes a second lens group, is disposed behind that focusing lens 4. Here the explanation will assume that the photographic subject side, in other words the left side of the drawing paper, is the front, and that the imaging unit 7 side, in other words the right side of the drawing paper, is the rear.

Although the details of the zoom mechanism are omitted, in response to the power supply of this digital camera 200 being turned ON, the lens barrel unit 100 is automatically pulled out from its retracted state shown in FIG. 1 to a wide angle end. Moreover, upon zoom actuation by the user, the lens barrel 100 can be pulled out as far as a telephoto end.

A shutter unit 6 is disposed behind the vibration reduction lens 5. This shutter unit 6 is used for exposure control. In the shutter unit 6, a shutter main body 6A that houses shutter blades and an aperture mechanism, and an actuator 6B that drives the shutter blades and the aperture, are built as an integrated mechanism. The shutter unit 6 functions as the shutter and also the aperture. It should be understood that, for example, an optical filter such as, in concrete terms, an ND filter or the like may be used as the aperture.

Figure 3:
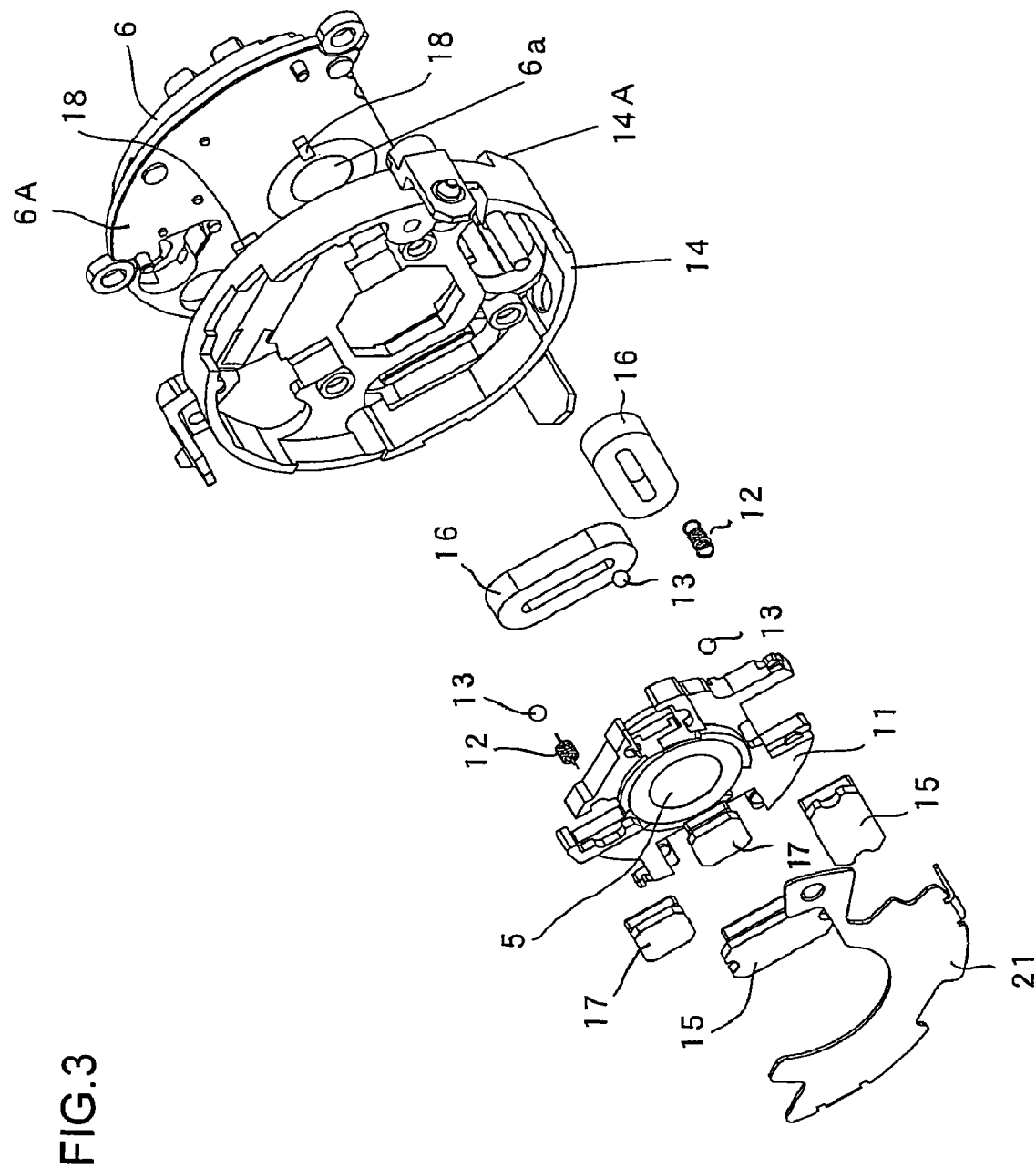
FIG. 3 is an exploded perspective view showing a vibration reduction mechanism of the barrel unit, and the shutter unit.
Figure 4:
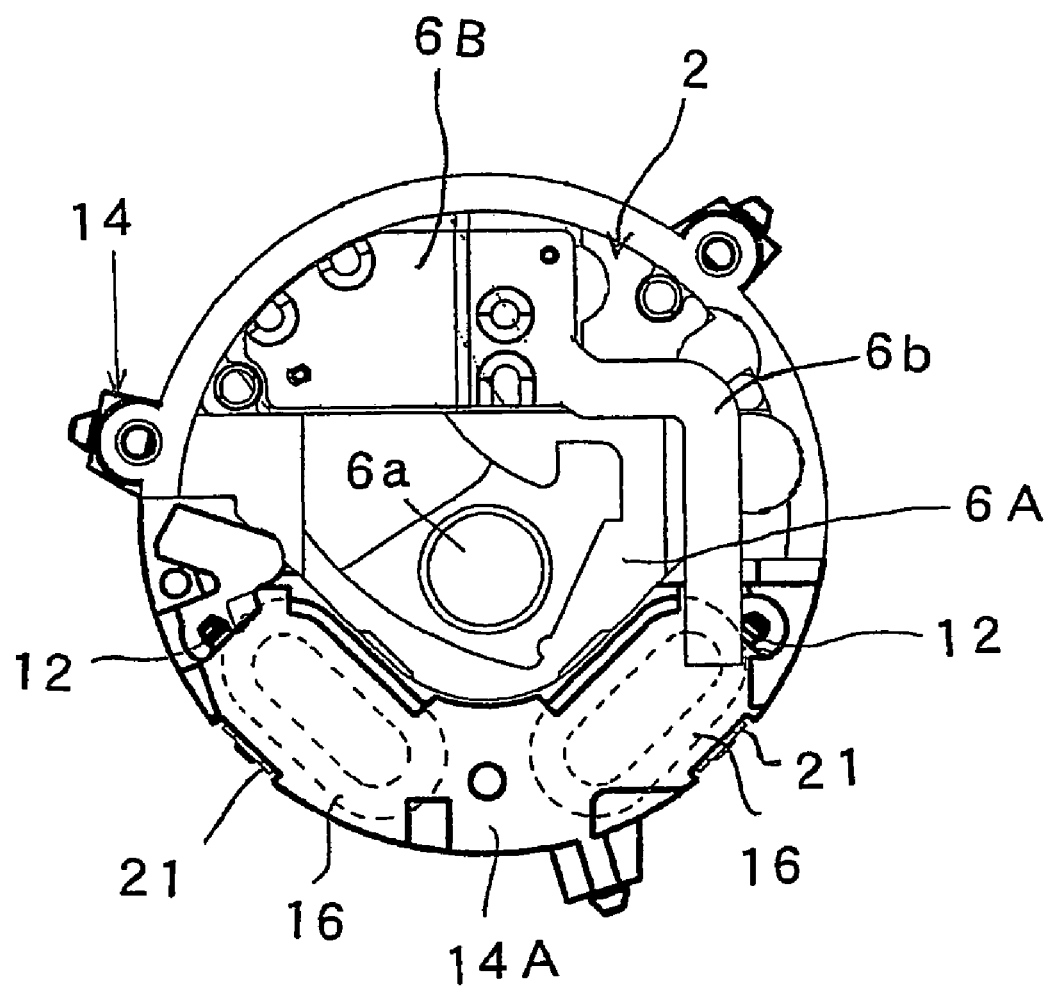
FIG. 4 is a view of the structure of FIG. 2, as seen in the direction shown by the arrows IV-IV.
Figure 5:
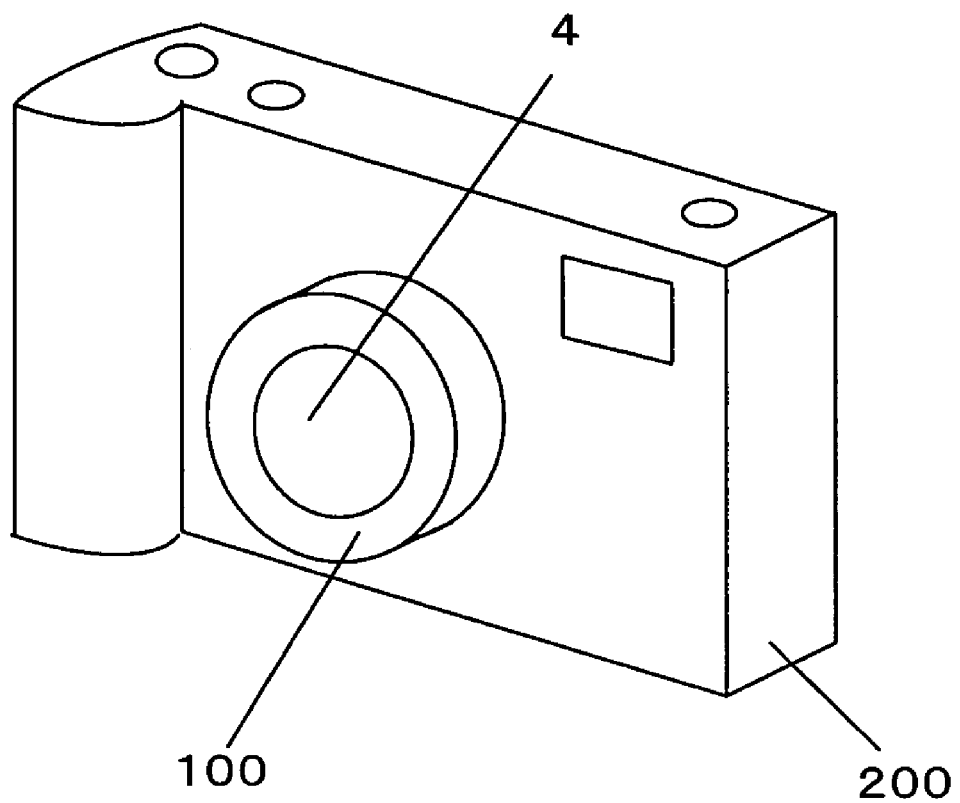
FIG. 5 is a perspective view of a digital camera to which a lens barrel according to this embodiment is fitted.

As shown in FIGS. 3 and 4, the shutter main body 6A matches the internal circumference of the second drive barrel 3 and is roughly circular, but its lower portion is cut away in an approximate V-shape. The reason that its lower portion is thus cut away in an approximate V-shape will be described hereinafter. The actuator 6B is fixed to the upper portion of the rear surface of the shutter main body 6A. A shutter opening 6a centered upon the optical axis is opened and closed by the shutter blades that are driven by the actuator 6B. A flexible printed substrate 6b (refer to FIG. 4) is a member for transmitting a blade drive signal and an aperture drive signal to the actuator 6B.

In FIG. 1, the imaging unit 7 is disposed further behind the shutter unit 6. In this imaging unit 7, an image sensor 7A such as a CCD or the like and an optical low pass filter 7B that is disposed in front of the image sensor 7A are made as an integrated structure.

The lens barrel unit 100 further includes an optical vibration reduction mechanism. This optical vibration reduction mechanism includes a vibration reduction lens 5, and a vibration sensor (not shown in the figures) and a pair of voice coil motors (hereinafter termed "VCMs") and the like. This optical vibration reduction mechanism detects shaking of the digital camera 200 with the vibration sensor, and alleviates shaking of the image upon a light receiving surface of the image sensor 7A by shifting the vibration reduction lens 5 in directions orthogonal to the optical axis based upon the detection output from the vibration sensor.

The vibration reduction lens 5 is held in a second lens group chamber 11, and, as shown in FIG. 3, this second lens group chamber 11 is pulled by tension springs 12 provided at two locations and pressed against a fixed frame 14 via balls 13 that are provided in three locations. This fixed frame 14 is fixed to an inner circumferential surface of the second drive barrel 3. The light flux that is transmitted through the focusing lens 4 and the vibration reduction lens 5 is conducted to the imaging unit 7 via an opening 14a of the fixed frame 14 and via the shutter opening 6a. It should be understood that the second lens group chamber 11 is pressed by a pressure plate 21.

The second lens group chamber 11 can shift smoothly with respect to the fixed frame 14 in directions orthogonal to the optical axis, due to the rotational movement of the above described balls 13. Furthermore, undesired movement of the second lens group chamber 11 in the direction of the optical axis is restrained, due to the biasing force of the tension springs 12.

Each of the pair of VCMs includes a drive magnet 15 and a coil 16, and functions as a drive source for the vibration reduction lens 5. In this embodiment, so called moving magnet type (MM type) VCMs are employed, and the pair of drive magnets 15 are held by the second lens group chamber 11, while the pair of coils 16 are held by the fixed frame 14.

Although the configuration of the coils 16 will be described hereinafter in detail, by supplying electrical current in these coils 16, via the magnets 15, electromagnetic force acts upon the second lens group chamber 11 in a direction orthogonal to the optical axis, and the second lens group chamber 11 and the vibration reduction lens 5 that is integral therewith are shifted in a direction orthogonal to the optical axis. By using the pair of VCMs, it is possible to shift the vibration reduction lens 5 in two directions orthogonal to the optical axis, and as a result it becomes possible to drive the lens 5 in any desired direction that is orthogonal to the optical axis.

Moreover, as shown in FIG. 3, a pair of position detection magnets 17 for detecting the position of the vibration reduction lens 5 are housed in advance within the second lens group chamber 11, and a pair of Hall elements 18 are held to the fixed frame 14 in positions that correspond to this pair of magnets 17. This optical vibration reduction mechanism executes vibration reduction control by acquiring, from the outputs of these Hall elements 18, the positions of the vibration reduction lens 5 in two directions orthogonal to the optical axis.

Next, the positional relationship of the coils 16 and the shutter unit 6 will be explained.

As shown in FIG. 2, bulge portions 14A that bulge towards the rear are formed at the lower portion of the fixed frame 14 as seen in the figure, and the above described pair of coils 16 are disposed in the interior of these bulge portions 14A. As seen from the rear, the bulge portions 14A are formed in approximately V-shapes (refer to FIG. 4), and the lower surfaces of these bulge portions 14A are formed as arcuate circular surfaces. In order to shift the second lens group chamber 11 in two directions that are mutually orthogonal, the pair of coils 16 are disposed at 90° to one another, so as to match the V-shaped bulge portions 14A, and are fixed to the insides of the rear surfaces of the bulge portions 14A.

The shutter unit 6 is disposed directly over the bulge portions 14A. In other words, the position of the shutter unit 6 along the direction of the optical axis and the position of the bulge portions 14A along the direction of the optical axis substantially coincide with one another. As described above, the lower portion of the shutter main body 6A is cut away in an approximate V-shape, and the shutter unit 6 is disposed so that this cut away portion fits into the approximately V-shaped bulge portions 14A. Due to this, as shown in FIG. 4, the structure is such that a single circle is described by the shutter unit 6 and the bulge portions 14A. Furthermore, as shown in FIG. 2, the rear surface of the shutter main body 6A and the rear surfaces of the bulge portions 14A are positioned in substantially the same plane.

According to the structure of the embodiment described above, the pair of coils 16 that are included in the vibration reduction drive mechanism and the shutter main body 6 are arranged so as to overlap in the direction orthogonal to the optical axis, in other words, so that their positions in the direction of the optical axis substantially correspond to each other. Accordingly, it is possible to shorten the total length when the lens barrel unit 100 is retracted, as compared with a construction in which these elements are separated from one another along the direction of the optical axis. Moreover, since the bulge portions 14A are formed in an approximately V-shape that matches the arrangement of the pair of coils 16, and the shape of the shutter main body 6A is determined so that it is embedded in this V-shape, accordingly it is possible to utilize the space within the lens barrel unit 100 in an effective manner without any waste thereof. It should be understood that a configuration would also be acceptable in which the pair of coils 16 and the shutter main body 6 did not perfectly overlap in the direction orthogonal to the optical axis, provided that they do partially overlap one another.

Moreover, although the imaging unit 7 is disposed immediately behind the shutter unit 6 as shown in FIG. 1, the actuator 6B that projects towards the rear from the shutter main body 6A is provided at the upper portion of the shutter main body 6, so as to avoid this imaging unit 7. In other words, since the actuator 6B and the imaging unit 7 are arranged so as partially to overlap in the direction orthogonal to the optical axis, accordingly it is possible further to shorten the total length of the lens barrel unit 100.

It should be understood that although, in the above, the coils 16 were disposed below the shutter unit 6, it would also be acceptable for the vertical relationship of these elements to be reversed; and, moreover, it would also be acceptable to provide a structure in which the shutter unit 6 and the pair of coils 16 were lined up along the horizontal direction.

As explained above, according to this embodiment of the present invention, in a lens barrel that includes the vibration reduction mechanism and the shutter unit 6, it is possible to shorten the total length of the lens barrel to the minimum limit.

The above-described embodiments are examples, and various modifications can be made without departing from the scope of the invention.

What is claimed is:

1. A lens barrel, comprising:
   a vibration reduction mechanism comprising a vibration reduction lens and a drive device that drives the vibration reduction lens, so as to compensate for image vibration; and
   a shutter unit for exposure control, wherein:
      the drive device and the shutter unit are arranged so as to at least partially to overlap in a direction orthogonal to an optical axis of the lens barrels
      the drive device comprises a pair of voice coil motors, with each of the voice coil motors comprising a drive magnet and a coil;
      positions of the coils in a direction of the optical axis substantially correspond to a position of the shutter unit in a direction of the optical axis; and
      the coils are disposed below the shutter unit with respect to the direction orthogonal to the optical axis so as to form a V-shape by arranging the coils to be perpendicular to one another.

2. A lens barrel according to claim 1, wherein:
   the shutter unit comprises a shutter main body and a shutter drive unit; and
   a rear surface of a support member that supports the drive device is positioned in substantially a same plane as a rear surface of the shutter main body.

3. A lens barrel according to claim 1, wherein:
   the shutter unit is shaped as a circle with a portion cut away as seen from a direction of the optical axis; and
   the drive device is arranged so as to be embedded in the cut away portion of the shutter unit.

4. A digital camera, comprising:
   an imaging unit that comprises an image sensor and
   a lens barrel according to claim 1.

5. A digital camera according to claim 4, wherein:
   the shutter unit comprises a shutter main body and a shutter drive unit that is fixed to a rear surface of the shutter main body; and
   the shutter drive unit and the imaging unit are arranged so as at least partially to overlap in a direction orthogonal to the optical axis of the lens barrel.

6. A digital camera according to claim 4, wherein:
   the imaging unit further comprises an optical filter that is disposed in front of the image sensor.

7. A digital camera according to claim 5, wherein: the imaging unit further comprises an optical filter that is disposed in front of the image sensor.

8. A lens barrel, comprising:
   a vibration reduction mechanism comprising a vibration reduction lens and a drive device that drives the vibration reduction lens, so as to compensate for image vibration;
   a support member that supports the drive device; and
   a shutter unit for exposure control, that comprises a shutter main body and shutter drive unit, wherein:
      the shutter main body includes a shutter blade; and
      the support member and the shutter blade are arranged so as to at least partially overlap in a direction orthogonal to an optical axis of the lens barrel.

9. A digital camera, comprising:
   a lens barrel; and
   an imaging unit that comprises an image sensor and an optical filter, wherein:
   the lens barrel comprises:
      a vibration reduction mechanism comprising a vibration reduction lens and a drive device that drives the vibration reduction lens so as to compensate for image vibration; and
      a shutter unit for exposure control, that comprises a shutter main body and shutter drive unit, wherein:
         the drive device and the shutter unit are arranged so as to at least partially overlap in a direction orthogonal to an optical axis of the lens barrel; and
         the shutter drive unit and the optical filter are arranged so as to at least partially overlap in the direction orthogonal to the optical axis of the lens barrel.

10. A digital camera according to claim 9 wherein the lens barrel comprises:
   a vibration reduction mechanism comprising a vibration reduction lens and a drive device that drives the vibration reduction lens, so as to compensate for image vibration;
   a support member that supports the drive device; and
   a shutter unit for exposure control, that comprises a shutter main body and shutter drive unit, wherein:
      the shutter main body includes a shutter blade; and
      the support member and the shutter blade are arranged so as to at least partially overlap in a direction orthogonal to an optical axis of the lens barrel.

* * * * *

UNITED STATES PATENT AND TRADEMARK OFFICE
CERTIFICATE OF CORRECTION

| | |
|---|---|
| PATENT NO. | : 7,747,152 B2 |
| APPLICATION NO. | : 12/007594 |
| DATED | : June 29, 2010 |
| INVENTOR(S) | : Shuji Iijima et al. |

It is certified that error appears in the above-identified patent and that said Letters Patent is hereby corrected as shown below:

Column 5, Line 47, after "partially" delete "to".

Column 5, Line 48, delete "barrels" and insert -- barrel; --, therefor.

Signed and Sealed this

Sixteenth Day of November, 2010

David J. Kappos
*Director of the United States Patent and Trademark Office*